United States Patent
Barnes

(10) Patent No.: US 8,318,028 B2
(45) Date of Patent: Nov. 27, 2012

(54) INFILTRATION/INFLOW CONTROL FOR MEMBRANE BIOREACTOR

(75) Inventor: Dennis J. Barnes, Oconomowoc, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 522 days.

(21) Appl. No.: 12/594,323

(22) PCT Filed: Apr. 1, 2008

(86) PCT No.: PCT/US2008/004224
§ 371 (c)(1),
(2), (4) Date: Mar. 17, 2010

(87) PCT Pub. No.: WO2008/123972
PCT Pub. Date: Oct. 16, 2008

(65) Prior Publication Data
US 2010/0326906 A1 Dec. 30, 2010

Related U.S. Application Data

(60) Provisional application No. 60/909,552, filed on Apr. 2, 2007.

(51) Int. Cl.
*C02F 3/00* (2006.01)
(52) U.S. Cl. ...... 210/768; 210/800; 210/804; 210/532.1
(58) Field of Classification Search .................. 210/768, 210/800, 804, 532.1
See application file for complete search history.

(56) References Cited

U.S. PATENT DOCUMENTS

| 256,008 | A | 4/1882 | Leak |
| 285,321 | A | 9/1883 | Tams |
| 511,995 | A | 1/1894 | Buckley |
| 1,997,074 | A | 4/1935 | Novotny |
| 2,080,783 | A | 5/1937 | Petersen |
| 2,105,700 | A | 1/1938 | Ramage |
| 2,843,038 | A | 7/1958 | Manspeaker |
| 2,926,086 | A | 2/1960 | Chenicek et al. |
| 3,139,401 | A | 6/1964 | Hach |
| 3,183,191 | A | 5/1965 | Hach |
| 3,191,674 | A | 6/1965 | Richardson |
| 3,198,636 | A | 8/1965 | Bouthilet |
| 3,228,876 | A | 1/1966 | Mahon |
| 3,275,554 | A | 9/1966 | Wagenaar |
| 3,442,002 | A | 5/1969 | Geary et al. |

(Continued)

FOREIGN PATENT DOCUMENTS

AU 34400/84 A 4/1985

(Continued)

OTHER PUBLICATIONS

"Chemical Cleaning Definition", Lenntech Bv, Lenntech Water treatment & purification Holding B.V., Chemical Cleaning.

(Continued)

*Primary Examiner* — Chester Barry

(57) ABSTRACT

A method and system for wastewater treatment comprising a first treatment zone (11) fluidly connected to one or more further treatment zones (12, 13, 14), a membrane module (16) comprising a filter membrane positioned in or fluidly connected to the further treatment zone (14), a gravity settling device (15) fluidly connected to the first treatment zone (11) to receive overflow therefrom; and a flow control device (23) between the first treatment zone (11) and the gravity settling device (15) to control the flow of liquid therebetween.

22 Claims, 3 Drawing Sheets

U.S. PATENT DOCUMENTS

| | | | |
|---|---|---|---|
| 3,462,362 A | 8/1969 | Kollsman | |
| 3,472,168 A | 10/1969 | Inoue et al. | |
| 3,472,765 A | 10/1969 | Budd et al. | |
| 3,492,698 A | 2/1970 | Geary et al. | |
| 3,501,798 A | 3/1970 | Carraro | |
| 3,505,215 A | 4/1970 | Bray | |
| 3,556,305 A | 1/1971 | Shorr | |
| 3,591,010 A | 7/1971 | Pall et al. | |
| 3,625,827 A | 12/1971 | Wildi et al. | |
| 3,654,147 A | 4/1972 | Levin | |
| 3,679,052 A | 7/1972 | Asper | |
| 3,693,406 A | 9/1972 | Tobin, III | |
| 3,700,561 A | 10/1972 | Ziffer | |
| 3,700,591 A | 10/1972 | Higley | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,795,609 A | 3/1974 | Hill et al. | |
| 3,804,258 A | 4/1974 | Okuniewski et al. | |
| 3,843,809 A | 10/1974 | Luck | |
| 3,876,738 A | 4/1975 | Marinaccio et al. | |
| 3,955,998 A | 5/1976 | Clampitt et al. | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,049,765 A | 9/1977 | Yamazaki | |
| 4,076,656 A | 2/1978 | White et al. | |
| 4,082,683 A | 4/1978 | Galesloot | |
| 4,105,556 A | 8/1978 | O'Amaddio et al. | |
| 4,105,731 A | 8/1978 | Yamazaki | |
| 4,107,043 A | 8/1978 | McKinney | |
| 4,138,460 A | 2/1979 | Tigner | |
| 4,157,899 A | 6/1979 | Wheaton | |
| 4,183,890 A | 1/1980 | Bollinger | |
| 4,188,817 A | 2/1980 | Steigelmann | |
| 4,190,411 A | 2/1980 | Fujimoto | |
| 4,190,419 A | 2/1980 | Bauer | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,243,525 A | 1/1981 | Greenberg | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,302,336 A | 11/1981 | Kawaguchi et al. | |
| 4,315,819 A | 2/1982 | King et al. | |
| 4,323,453 A | 4/1982 | Zampini | |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,367,139 A | 1/1983 | Graham | |
| 4,367,140 A | 1/1983 | Wilson | |
| 4,369,605 A | 1/1983 | Opersteny et al. | |
| 4,371,427 A * | 2/1983 | Holler et al. | 203/3 |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,405,688 A | 9/1983 | Lowery et al. | |
| 4,407,975 A | 10/1983 | Yamaguchi | |
| 4,414,113 A | 11/1983 | LaTerra | |
| 4,414,172 A | 11/1983 | Leason | |
| 4,415,452 A | 11/1983 | Heil et al. | |
| 4,431,545 A | 2/1984 | Pall et al. | |
| 4,451,369 A | 5/1984 | Sekino et al. | |
| 4,462,855 A | 7/1984 | Yankowsky et al. | |
| 4,467,001 A | 8/1984 | Coplan et al. | |
| 4,476,015 A | 10/1984 | Schmitt et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Muller | |
| 4,519,909 A | 5/1985 | Castro | |
| 4,539,940 A | 9/1985 | Young | |
| 4,540,490 A | 9/1985 | Shibata et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,460 A | 11/1986 | Kuzumoto et al. | |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,650,596 A | 3/1987 | Schlueter et al. | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,756,875 A | 7/1988 | Tajima et al. | |
| 4,763,612 A | 8/1988 | Iwanami | |
| 4,767,539 A | 8/1988 | Ford | |
| 4,774,132 A | 9/1988 | Joffee et al. | |
| 4,775,471 A | 10/1988 | Nagai et al. | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,800,019 A | 1/1989 | Bikson et al. | |
| 4,810,384 A | 3/1989 | Fabre | |
| 4,812,235 A | 3/1989 | Seleman et al. | |
| 4,816,160 A | 3/1989 | Ford et al. | |
| 4,824,563 A | 4/1989 | Iwahori et al. | |
| 4,834,998 A | 5/1989 | Shrikhande | |
| 4,839,048 A | 6/1989 | Reed et al. | |
| 4,840,227 A | 6/1989 | Schmidt | |
| 4,846,970 A | 7/1989 | Bertelsen et al. | |
| 4,867,883 A | 9/1989 | Daigger et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,952,317 A | 8/1990 | Culkin | |
| 4,963,304 A | 10/1990 | Im et al. | |
| 4,966,699 A | 10/1990 | Sasaki et al. | |
| 4,968,430 A | 11/1990 | Hildenbrand et al. | |
| 4,968,733 A | 11/1990 | Muller et al. | |
| 4,969,997 A | 11/1990 | Kluver et al. | |
| 4,988,444 A | 1/1991 | Applegate et al. | |
| 4,999,038 A | 3/1991 | Lundberg | |
| 5,002,666 A | 3/1991 | Matsumoto et al. | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |

| Patent No. | Date | Inventor(s) | Patent No. | Date | Inventor(s) |
|---|---|---|---|---|---|
| 5,059,317 A | 10/1991 | Marius et al. | 5,531,848 A | 7/1996 | Brinda et al. |
| 5,066,375 A | 11/1991 | Parsi et al. | 5,531,900 A | 7/1996 | Raghavan et al. |
| 5,066,401 A | 11/1991 | Muller et al. | 5,543,002 A | 8/1996 | Brinda et al. |
| 5,066,402 A | 11/1991 | Anselme et al. | 5,552,047 A | 9/1996 | Oshida et al. |
| 5,069,065 A | 12/1991 | Sprunt et al. | 5,554,283 A | 9/1996 | Brinda et al. |
| 5,069,353 A | 12/1991 | Espenan | 5,556,591 A | 9/1996 | Jallerat et al. |
| 5,075,065 A | 12/1991 | Effenberger et al. | 5,575,963 A | 11/1996 | Soffer et al. |
| 5,076,925 A | 12/1991 | Roesink et al. | 5,597,732 A | 1/1997 | Bryan-Brown |
| 5,079,272 A | 1/1992 | Allegrezza, Jr. et al. | 5,607,593 A | 3/1997 | Cote et al. |
| 5,094,750 A | 3/1992 | Kopp et al. | 5,629,084 A | 5/1997 | Moya |
| 5,094,867 A | 3/1992 | Detering et al. | 5,633,163 A | 5/1997 | Cameron |
| 5,098,567 A | 3/1992 | Nishiguchi | 5,639,373 A | 6/1997 | Mahendran et al. |
| 5,104,535 A | 4/1992 | Cote et al. | 5,643,455 A | 7/1997 | Kopp et al. |
| 5,104,546 A | 4/1992 | Filson et al. | 5,647,988 A | 7/1997 | Kawanishi et al. |
| H001045 H | 5/1992 | Wilson | 5,670,053 A | 9/1997 | Collentro et al. |
| 5,135,663 A | 8/1992 | Newberth, III et al. | 5,677,360 A | 10/1997 | Yamamori et al. |
| 5,137,631 A | 8/1992 | Eckman et al. | 5,688,460 A | 11/1997 | Ruschke |
| 5,138,870 A | 8/1992 | Lyssy | 5,690,830 A | 11/1997 | Ohtani et al. |
| 5,147,553 A | 9/1992 | Waite | 5,733,456 A | 3/1998 | Okey et al. |
| 5,151,191 A | 9/1992 | Sunaoka et al. | 5,744,037 A | 4/1998 | Fujimura et al. |
| 5,151,193 A | 9/1992 | Grobe et al. | 5,747,605 A | 5/1998 | Breant et al. |
| 5,158,721 A | 10/1992 | Allegrezza, Jr. et al. | 5,766,479 A | 6/1998 | Collentro et al. |
| 5,169,528 A | 12/1992 | Karbachsch et al. | D396,046 S | 7/1998 | Scheel et al. |
| 5,169,530 A | 12/1992 | Schucker et al. | 5,783,083 A | 7/1998 | Henshaw et al. |
| 5,182,019 A | 1/1993 | Cote et al. | D396,726 S | 8/1998 | Sadr et al. |
| 5,186,821 A | 2/1993 | Murphy | D400,890 S | 11/1998 | Gambardella |
| 5,192,442 A | 3/1993 | Piccirillo et al. | 5,843,069 A | 12/1998 | Butler et al. |
| 5,192,456 A | 3/1993 | Ishida et al. | 5,846,424 A | 12/1998 | Khudenko |
| 5,192,478 A | 3/1993 | Caskey | 5,871,823 A | 2/1999 | Anders et al. |
| 5,194,149 A | 3/1993 | Selbie et al. | 5,888,401 A | 3/1999 | Nguyen |
| 5,198,116 A | 3/1993 | Comstock et al. | 5,895,521 A | 4/1999 | Otsuka et al. |
| 5,198,162 A | 3/1993 | Park et al. | 5,895,570 A | 4/1999 | Liang |
| 5,203,405 A | 4/1993 | Gentry et al. | 5,906,739 A | 5/1999 | Osterland et al. |
| 5,209,852 A | 5/1993 | Sunaoka et al. | 5,906,742 A | 5/1999 | Wang et al. |
| 5,211,823 A | 5/1993 | Giuffrida et al. | 5,910,250 A | 6/1999 | Mahendran et al. |
| 5,221,478 A | 6/1993 | Dhingra et al. | 5,914,039 A | 6/1999 | Mahendran et al. |
| 5,227,063 A | 7/1993 | Langerak et al. | 5,918,264 A | 6/1999 | Drummond et al. |
| 5,248,424 A | 9/1993 | Cote et al. | 5,942,113 A | 8/1999 | Morimura |
| 5,262,054 A | 11/1993 | Wheeler | 5,944,997 A | 8/1999 | Pedersen et al. |
| 5,269,919 A | 12/1993 | von Medlin | 5,951,878 A | 9/1999 | Astrom |
| 5,271,830 A | 12/1993 | Faivre et al. | 5,958,243 A | 9/1999 | Lawrence et al. |
| 5,275,766 A | 1/1994 | Gadkaree et al. | 5,961,830 A | 10/1999 | Barnett |
| 5,286,324 A | 2/1994 | Kawai et al. | 5,968,357 A | 10/1999 | Doelle et al. |
| 5,290,451 A | 3/1994 | Koster et al. | 5,988,400 A | 11/1999 | Karachevtcev et al. |
| 5,290,457 A | 3/1994 | Karbachsch et al. | 5,989,428 A | 11/1999 | Goronszy |
| 5,297,420 A | 3/1994 | Gilliland et al. | 5,997,745 A | 12/1999 | Tonelli et al. |
| 5,316,671 A | 5/1994 | Murphy | 6,001,254 A | 12/1999 | Espenan et al. |
| 5,320,760 A | 6/1994 | Freund et al. | 6,007,712 A | 12/1999 | Tanaka et al. |
| 5,353,630 A | 10/1994 | Soda et al. | 6,017,451 A | 1/2000 | Kopf |
| 5,354,470 A | 10/1994 | Seita et al. | 6,024,872 A | 2/2000 | Mahendran et al. |
| 5,358,732 A | 10/1994 | Seifter et al. | 6,036,030 A | 3/2000 | Stone et al. |
| 5,361,625 A | 11/1994 | Ylvisaker | 6,039,872 A | 3/2000 | Wu et al. |
| 5,364,527 A | 11/1994 | Zimmermann et al. | 6,042,677 A | 3/2000 | Mahendran et al. |
| 5,364,529 A | 11/1994 | Morin et al. | 6,045,698 A | 4/2000 | Cote et al. |
| 5,374,353 A | 12/1994 | Murphy | 6,045,899 A | 4/2000 | Wang et al. |
| 5,389,260 A | 2/1995 | Hemp et al. | 6,048,454 A | 4/2000 | Jenkins |
| 5,393,433 A | 2/1995 | Espenan et al. | 6,048,455 A | 4/2000 | Janik |
| 5,396,019 A | 3/1995 | Sartori et al. | 6,066,401 A | 5/2000 | Stilburn |
| 5,401,401 A | 3/1995 | Hickok et al. | 6,071,404 A | 6/2000 | Tsui |
| 5,401,405 A | 3/1995 | McDougald | 6,074,718 A | 6/2000 | Puglia et al. |
| 5,403,479 A | 4/1995 | Smith et al. | 6,077,435 A | 6/2000 | Beck et al. |
| 5,405,528 A | 4/1995 | Selbie et al. | 6,083,393 A | 7/2000 | Wu et al. |
| 5,411,663 A | 5/1995 | Johnson | 6,096,213 A | 8/2000 | Radovanovic et al. |
| 5,417,101 A | 5/1995 | Weich | 6,113,782 A | 9/2000 | Leonard |
| 5,419,816 A | 5/1995 | Sampson et al. | 6,120,688 A | 9/2000 | Daly et al. |
| 5,425,415 A | 6/1995 | Master et al. | 6,126,819 A | 10/2000 | Heine et al. |
| 5,451,317 A | 9/1995 | Ishida et al. | 6,146,747 A | 11/2000 | Wang et al. |
| 5,458,779 A | 10/1995 | Odegaard | 6,149,817 A | 11/2000 | Peterson et al. |
| 5,468,397 A | 11/1995 | Barboza et al. | 6,156,200 A | 12/2000 | Zha et al. |
| 5,470,469 A | 11/1995 | Eckman | 6,159,373 A | 12/2000 | Beck et al. |
| 5,477,731 A | 12/1995 | Mouton | 6,193,890 B1 | 2/2001 | Pedersen et al. |
| 5,479,590 A | 12/1995 | Lin | 6,202,475 B1 | 3/2001 | Selbie et al. |
| 5,480,553 A | 1/1996 | Yamamori et al. | 6,214,231 B1 | 4/2001 | Cote et al. |
| 5,482,625 A | 1/1996 | Shimizu et al. | 6,214,232 B1 | 4/2001 | Baurmeister et al. |
| 5,484,528 A | 1/1996 | Yagi et al. | 6,221,247 B1 | 4/2001 | Nemser et al. |
| 5,490,939 A | 2/1996 | Gerigk et al. | 6,245,239 B1 | 6/2001 | Cote et al. |
| 5,491,023 A | 2/1996 | Tsai et al. | 6,254,773 B1 | 7/2001 | Biltoft |
| 5,501,798 A | 3/1996 | Al-Samadi et al. | 6,264,839 B1 | 7/2001 | Mohr et al. |
| 5,525,220 A | 6/1996 | Yagi et al. | 6,277,512 B1 | 8/2001 | Hamrock et al. |

| | | | | | | |
|---|---|---|---|---|---|---|
| 6,280,626 B1 | 8/2001 | Miyashita et al. | | 6,863,817 B2 | 3/2005 | Liu et al. |
| 6,284,135 B1 | 9/2001 | Ookata | | 6,863,818 B2 | 3/2005 | Daigger et al. |
| 6,290,756 B1 | 9/2001 | Macheras et al. | | 6,863,823 B2 | 3/2005 | Cote |
| 6,294,039 B1 | 9/2001 | Mahendran et al. | | 6,869,534 B2 | 3/2005 | McDowell et al. |
| 6,299,773 B1 | 10/2001 | Takamura et al. | | 6,872,305 B2 | 3/2005 | Johnson et al. |
| 6,303,026 B1 | 10/2001 | Lindbo | | 6,881,343 B2 | 4/2005 | Rabie et al. |
| 6,303,035 B1 | 10/2001 | Cote et al. | | 6,884,350 B2 | 4/2005 | Muller |
| 6,315,895 B1 | 11/2001 | Summerton et al. | | 6,884,375 B2 | 4/2005 | Wang et al. |
| 6,319,411 B1 | 11/2001 | Cote | | 6,890,435 B2 | 5/2005 | Ji et al. |
| 6,322,703 B1 | 11/2001 | Taniguchi et al. | | 6,890,645 B2 | 5/2005 | Disse et al. |
| 6,324,898 B1 | 12/2001 | Cote et al. | | 6,893,568 B1 | 5/2005 | Janson et al. |
| 6,325,928 B1 | 12/2001 | Pedersen et al. | | 6,899,812 B2 | 5/2005 | Cote et al. |
| 6,325,938 B1 | 12/2001 | Miyashita et al. | | 6,946,073 B2 | 9/2005 | Daigger et al. |
| 6,331,248 B1 | 12/2001 | Taniguchi et al. | | 6,952,258 B2 | 10/2005 | Ebert et al. |
| 6,337,018 B1 | 1/2002 | Mickols | | 6,955,762 B2 | 10/2005 | Gallagher et al. |
| RE37,549 E | 2/2002 | Mahendran et al. | | 6,962,258 B2 | 11/2005 | Zha et al. |
| 6,349,835 B1 | 2/2002 | Saux et al. | | 6,964,741 B2 | 11/2005 | Mahendran et al. |
| 6,354,444 B1 | 3/2002 | Mahendran et al. | | 6,969,465 B2 | 11/2005 | Zha et al. |
| 6,361,695 B1 | 3/2002 | Husain et al. | | 6,974,554 B2 | 12/2005 | Cox et al. |
| 6,368,819 B1 | 4/2002 | Gaddy et al. | | 6,994,867 B1 | 2/2006 | Hossainy et al. |
| 6,372,138 B1 | 4/2002 | Cho et al. | | 7,005,100 B2 | 2/2006 | Lowell |
| 6,375,848 B1 | 4/2002 | Cote et al. | | 7,014,763 B2 | 3/2006 | Johnson et al. |
| 6,383,369 B2 | 5/2002 | Elston | | 7,018,530 B2 | 3/2006 | Pollock |
| 6,387,189 B1 | 5/2002 | Groschl et al. | | 7,018,533 B2 | 3/2006 | Johnson et al. |
| 6,402,955 B2 | 6/2002 | Ookata | | 7,022,233 B2 | 4/2006 | Chen |
| 6,406,629 B1 | 6/2002 | Husain et al. | | 7,041,728 B2 | 5/2006 | Zipplies et al. |
| 6,423,214 B1 | 7/2002 | Lindbo | | 7,052,610 B2 | 5/2006 | Janson et al. |
| 6,423,784 B1 | 7/2002 | Hamrock et al. | | 7,083,733 B2 | 8/2006 | Freydina et al. |
| 6,432,310 B1 | 8/2002 | Andou et al. | | 7,087,173 B2 | 8/2006 | Cote et al. |
| 6,440,303 B2 | 8/2002 | Spriegel | | 7,122,121 B1 | 10/2006 | Ji |
| D462,699 S | 9/2002 | Johnson et al. | | 7,147,777 B1 | 12/2006 | Porteous |
| 6,444,124 B1 | 9/2002 | Onyeche et al. | | 7,147,778 B1 | 12/2006 | DiMassimo et al. |
| 6,468,430 B1 | 10/2002 | Kimura et al. | | 7,160,455 B2 | 1/2007 | Taniguchi et al. |
| 6,471,869 B1 | 10/2002 | Yanou et al. | | 7,160,463 B2 | 1/2007 | Beck et al. |
| 6,485,645 B1 | 11/2002 | Husain et al. | | 7,160,464 B2 | 1/2007 | Lee et al. |
| 6,495,041 B2 | 12/2002 | Taniguchi et al. | | 7,172,699 B1 | 2/2007 | Trivedi et al. |
| 6,517,723 B1 | 2/2003 | Daigger et al. | | 7,172,701 B2 | 2/2007 | Gaid et al. |
| 6,524,481 B2 | 2/2003 | Zha et al. | | 7,186,344 B2 | 3/2007 | Hughes |
| 6,524,733 B1 | 2/2003 | Nonobe | | 7,208,091 B2 | 4/2007 | Pind et al. |
| 6,550,747 B2 | 4/2003 | Rabie et al. | | 7,223,340 B2 | 5/2007 | Zha et al. |
| 6,555,005 B1 | 4/2003 | Zha et al. | | 7,226,541 B2 | 6/2007 | Muller et al. |
| 6,562,237 B1 | 5/2003 | Olaopa | | 7,247,238 B2 | 7/2007 | Mullette et al. |
| 6,576,136 B1 | 6/2003 | De Moel et al. | | 7,264,716 B2 | 9/2007 | Johnson et al. |
| 6,592,762 B2 | 7/2003 | Smith | | 7,279,100 B2 | 10/2007 | Devine |
| D478,913 S | 8/2003 | Johnson et al. | | 7,300,022 B2 | 11/2007 | Muller |
| 6,613,222 B2 | 9/2003 | Mikkelson et al. | | 7,314,563 B2 | 1/2008 | Cho et al. |
| 6,620,319 B2 | 9/2003 | Behmann et al. | | 7,329,344 B2 | 2/2008 | Jordan et al. |
| 6,627,082 B2 | 9/2003 | Del Vecchio et al. | | 7,344,645 B2 | 3/2008 | Beck et al. |
| 6,632,358 B1 | 10/2003 | Suga et al. | | 7,361,274 B2 | 4/2008 | Lazaredes |
| 6,635,179 B1 | 10/2003 | Summerton et al. | | 7,378,024 B2 | 5/2008 | Bartels et al. |
| 6,641,733 B2 | 11/2003 | Zha et al. | | 7,387,723 B2 | 6/2008 | Jordan |
| 6,645,374 B2 | 11/2003 | Cote et al. | | 7,404,896 B2 | 7/2008 | Muller |
| 6,656,356 B2 | 12/2003 | Gungerich et al. | | 7,455,765 B2 | 11/2008 | Elefritz et al. |
| 6,682,652 B2 | 1/2004 | Mahendran et al. | | 7,481,933 B2 | 1/2009 | Barnes |
| 6,685,832 B2 | 2/2004 | Mahendran et al. | | 7,510,655 B2 | 3/2009 | Barnes |
| 6,696,465 B2 | 2/2004 | Dellaria et al. | | 7,531,042 B2 | 5/2009 | Murkute et al. |
| 6,702,561 B2 | 3/2004 | Stillig et al. | | 7,563,363 B2 | 7/2009 | Kuzma |
| 6,706,185 B2 | 3/2004 | Goel et al. | | 7,591,950 B2 | 9/2009 | Zha et al. |
| 6,706,189 B2 | 3/2004 | Rabie et al. | | 7,632,439 B2 | 12/2009 | Mullette et al. |
| 6,708,957 B2 | 3/2004 | Guibert et al. | | 7,662,212 B2 | 2/2010 | Mullette et al. |
| 6,712,970 B1 | 3/2004 | Trivedi | | 7,708,887 B2 | 5/2010 | Johnson et al. |
| 6,721,529 B2 | 4/2004 | Chen et al. | | 7,713,413 B2 | 5/2010 | Barnes |
| 6,723,758 B2 | 4/2004 | Stone et al. | | 7,718,057 B2 | 5/2010 | Jordan et al. |
| 6,727,305 B1 | 4/2004 | Pavez Aranguiz | | 7,718,065 B2 | 5/2010 | Jordan |
| 6,743,362 B1 | 6/2004 | Porteous et al. | | 7,722,769 B2 | 5/2010 | Jordan et al. |
| 6,755,970 B1 | 6/2004 | Knappe et al. | | 7,761,826 B1 | 7/2010 | Thanvantri et al. |
| 6,758,972 B2 | 7/2004 | Vriens et al. | | 7,819,956 B2 | 10/2010 | Muller |
| 6,770,202 B1 | 8/2004 | Kidd et al. | | 7,850,851 B2 | 12/2010 | Zha et al. |
| 6,780,466 B2 | 8/2004 | Grangeon et al. | | 7,862,719 B2 | 1/2011 | McMahon et al. |
| 6,783,008 B2 | 8/2004 | Zha et al. | | 7,931,463 B2 | 4/2011 | Cox et al. |
| 6,790,912 B2 | 9/2004 | Blong | | 7,938,966 B2 | 5/2011 | Johnson |
| 6,805,806 B2 | 10/2004 | Arnaud | | 2001/0047962 A1 | 12/2001 | Zha et al. |
| 6,808,629 B2 | 10/2004 | Wouters-Wasiak et al. | | 2001/0052494 A1 | 12/2001 | Cote et al. |
| 6,811,696 B2 | 11/2004 | Wang et al. | | 2002/0070157 A1 | 6/2002 | Yamada |
| 6,814,861 B2 | 11/2004 | Husain et al. | | 2002/0117444 A1 | 8/2002 | Mikkelson et al. |
| 6,821,420 B2 | 11/2004 | Zha et al. | | 2002/0148767 A1 | 10/2002 | Johnson et al. |
| 6,830,782 B2 | 12/2004 | Kanazawa | | 2002/0153313 A1 | 10/2002 | Cote |
| 6,841,070 B2 | 1/2005 | Zha et al. | | 2002/0185435 A1 | 12/2002 | Husain et al. |
| 6,861,466 B2 | 3/2005 | Dadalas et al. | | 2002/0189999 A1 | 12/2002 | Espenan et al. |

| | | | | | | |
|---|---|---|---|---|---|---|
| 2002/0195390 | A1 | 12/2002 | Zha et al. | 2007/0084791 A1 | 4/2007 | Jordan et al. |
| 2003/0038080 | A1 | 2/2003 | Vriens et al. | 2007/0084795 A1 | 4/2007 | Jordan |
| 2003/0042199 | A1 | 3/2003 | Smith | 2007/0108125 A1 | 5/2007 | Cho et al. |
| 2003/0056919 | A1 | 3/2003 | Beck | 2007/0138090 A1 | 6/2007 | Jordan et al. |
| 2003/0057155 | A1 | 3/2003 | Husain et al. | 2007/0170112 A1 | 7/2007 | Elefritz et al. |
| 2003/0075495 | A1 | 4/2003 | Dannstrom et al. | 2007/0181496 A1 | 8/2007 | Zuback |
| 2003/0121855 | A1 | 7/2003 | Kopp | 2007/0227973 A1 | 10/2007 | Zha et al. |
| 2003/0127388 | A1 | 7/2003 | Ando et al. | 2008/0053923 A1 | 3/2008 | Beck et al. |
| 2003/0146153 | A1 | 8/2003 | Cote et al. | 2008/0093297 A1 | 4/2008 | Gock et al. |
| 2003/0150807 | A1 | 8/2003 | Bartels et al. | 2008/0156745 A1 | 7/2008 | Zha et al. |
| 2003/0159988 | A1 | 8/2003 | Daigger et al. | 2008/0179249 A1 | 7/2008 | Beck et al. |
| 2003/0178365 | A1 | 9/2003 | Zha et al. | 2008/0190846 A1 | 8/2008 | Cox et al. |
| 2003/0196955 | A1 | 10/2003 | Hughes | 2008/0203017 A1 | 8/2008 | Zha et al. |
| 2003/0226797 | A1 | 12/2003 | Phelps | 2008/0257822 A1 | 10/2008 | Johnson |
| 2003/0234221 | A1 | 12/2003 | Johnson et al. | 2008/0277340 A1 | 11/2008 | Hong et al. |
| 2004/0007525 | A1 | 1/2004 | Rabie et al. | 2009/0001018 A1 | 1/2009 | Zha et al. |
| 2004/0035770 | A1 | 2/2004 | Edwards et al. | 2009/0223895 A1 | 9/2009 | Zha et al. |
| 2004/0045893 | A1 | 3/2004 | Watanabe et al. | 2009/0255873 A1 | 10/2009 | Biltoft et al. |
| 2004/0050791 | A1 | 3/2004 | Herczeg | 2010/0000941 A1 | 1/2010 | Muller |
| 2004/0055974 | A1 | 3/2004 | Del Vecchio et al. | 2010/0012585 A1 | 1/2010 | Zha et al. |
| 2004/0084369 | A1 | 5/2004 | Zha et al. | 2010/0025320 A1 | 2/2010 | Johnson |
| 2004/0108268 | A1 | 6/2004 | Liu et al. | 2010/0051545 A1 | 3/2010 | Johnson et al. |
| 2004/0112831 | A1 | 6/2004 | Rabie et al. | 2010/0170847 A1 | 7/2010 | Zha et al. |
| 2004/0139992 | A1 | 7/2004 | Murkute et al. | 2010/0200503 A1 | 8/2010 | Zha et al. |
| 2004/0145076 | A1 | 7/2004 | Zha et al. | 2010/0300968 A1 | 12/2010 | Liu et al. |
| 2004/0149655 | A1 | 8/2004 | Petrucco et al. | 2011/0056522 A1 | 3/2011 | Zauner et al. |
| 2004/0154671 | A1 | 8/2004 | Martins et al. | 2011/0100907 A1 | 5/2011 | Zha et al. |
| 2004/0168978 | A1 | 9/2004 | Gray | 2011/0114557 A2 | 5/2011 | Johnson et al. |
| 2004/0168979 | A1 | 9/2004 | Zha et al. | 2011/0127209 A1 | 6/2011 | Rogers et al. |
| 2004/0173525 | A1 | 9/2004 | Hunniford et al. | 2011/0132826 A1 | 6/2011 | Muller et al. |
| 2004/0178154 | A1 | 9/2004 | Zha et al. | 2011/0139715 A1 | 6/2011 | Zha et al. |
| 2004/0188341 | A1 | 9/2004 | Zha et al. | 2011/0192783 A1 | 8/2011 | Cox et al. |
| 2004/0211726 | A1 | 10/2004 | Baig et al. | 2011/0198283 A1 | 8/2011 | Zha et al. |
| 2004/0217053 | A1 | 11/2004 | Zha et al. | | | |
| 2004/0222158 | A1 | 11/2004 | Husain et al. | FOREIGN PATENT DOCUMENTS | | |
| 2004/0232076 | A1 | 11/2004 | Zha et al. | AU | 55847/86 A | 9/1986 |
| 2004/0238442 | A1 | 12/2004 | Johnson et al. | AU | 77066/87 A | 2/1988 |
| 2004/0245174 | A1 | 12/2004 | Takayama et al. | AU | 762091 B2 | 6/2003 |
| 2005/0006308 | A1 | 1/2005 | Cote et al. | CA | 2531764 A1 | 3/2005 |
| 2005/0023219 | A1 | 2/2005 | Kirker et al. | CN | 1050770 | 1/1995 |
| 2005/0029185 | A1 | 2/2005 | Muller | CN | 2204898Y Y | 8/1995 |
| 2005/0029186 | A1 | 2/2005 | Muller | CN | 2236049Y Y | 9/1996 |
| 2005/0032982 | A1 | 2/2005 | Muller | CN | 1159769 A | 9/1997 |
| 2005/0045557 | A1 | 3/2005 | Daigger et al. | CN | 1249698 A | 4/2000 |
| 2005/0061725 | A1 | 3/2005 | Liu et al. | CN | 1541757 A | 11/2004 |
| 2005/0077227 | A1 | 4/2005 | Kirker et al. | DE | 3904544 A1 | 8/1990 |
| 2005/0098494 | A1 | 5/2005 | Mullette et al. | DE | 4117281 A1 | 1/1992 |
| 2005/0103722 | A1 | 5/2005 | Freydina et al. | DE | 4113420 A1 | 10/1992 |
| 2005/0109692 | A1 | 5/2005 | Zha et al. | DE | 4117422 C1 | 11/1992 |
| 2005/0115880 | A1 | 6/2005 | Pollock | DE | 4326603 A1 | 2/1995 |
| 2005/0115899 | A1 | 6/2005 | Liu et al. | DE | 19503060 A1 | 8/1996 |
| 2005/0121389 | A1 | 6/2005 | Janson et al. | DE | 29804927 U1 | 6/1998 |
| 2005/0126963 | A1 | 6/2005 | Phagoo et al. | DE | 29906389 U1 | 6/1999 |
| 2005/0139538 | A1 | 6/2005 | Lazaredes | DE | 10209170 C1 | 8/2003 |
| 2005/0184008 | A1 | 8/2005 | Schacht et al. | EP | 012557 | 2/1983 |
| 2005/0194310 | A1 | 9/2005 | Yamamoto et al. | EP | 126714 A2 | 11/1984 |
| 2005/0194315 | A1 | 9/2005 | Adams et al. | EP | 050447 B1 | 10/1985 |
| 2005/0258098 | A1 | 11/2005 | Vincent et al. | EP | 194735 A2 | 9/1986 |
| 2006/0000775 | A1 | 1/2006 | Zha et al. | EP | 250337 A1 | 12/1987 |
| 2006/0021929 | A1 | 2/2006 | Mannheim et al. | EP | 327025 A1 | 8/1989 |
| 2006/0065596 | A1 | 3/2006 | Kent et al. | EP | 344633 A1 | 12/1989 |
| 2006/0081533 | A1 | 4/2006 | Khudenko | EP | 090383 B1 | 5/1990 |
| 2006/0131234 | A1 | 6/2006 | Zha et al. | EP | 407900 A2 | 1/1991 |
| 2006/0201876 | A1 | 9/2006 | Jordan | EP | 463627 A2 | 1/1992 |
| 2006/0201879 | A1 | 9/2006 | Den Boestert et al. | EP | 0464321 A1 | 1/1992 |
| 2006/0249448 | A1 | 11/2006 | Fujishima et al. | EP | 492942 A2 | 7/1992 |
| 2006/0249449 | A1 | 11/2006 | Nakhla et al. | EP | 518250 B1 | 12/1992 |
| 2006/0261007 | A1 | 11/2006 | Zha et al. | EP | 547575 A1 | 6/1993 |
| 2006/0273007 | A1 | 12/2006 | Zha et al. | EP | 280052 B1 | 7/1994 |
| 2006/0273038 | A1 | 12/2006 | Syed et al. | EP | 395133 B1 | 2/1995 |
| 2007/0007205 | A1 | 1/2007 | Johnson et al. | EP | 662341 A1 | 7/1995 |
| 2007/0007214 | A1 | 1/2007 | Zha et al. | EP | 492446 B1 | 11/1995 |
| 2007/0039888 | A1 | 2/2007 | Ginzburg et al. | EP | 430082 B1 | 6/1996 |
| 2007/0045183 | A1 | 3/2007 | Murphy | EP | 734758 A1 | 10/1996 |
| 2007/0051679 | A1 | 3/2007 | Adams et al. | EP | 763758 A1 | 3/1997 |
| 2007/0056904 | A1 | 3/2007 | Hogt et al. | EP | 824956 A2 | 2/1998 |
| 2007/0056905 | A1 | 3/2007 | Beck et al. | EP | 848194 A2 | 6/1998 |
| 2007/0075017 | A1 | 4/2007 | Kuzma | EP | 855214 A1 | 7/1998 |
| 2007/0075021 | A1 | 4/2007 | Johnson | EP | 627255 B1 | 1/1999 |

| | | | | | | |
|---|---|---|---|---|---|---|
| EP | 911073 | A1 | 4/1999 | JP | 02284035 A | 11/1990 |
| EP | 920904 | A2 | 6/1999 | JP | 03018373 A | 1/1991 |
| EP | 1156015 | A | 5/2000 | JP | 03028797 A | 2/1991 |
| EP | 1034835 | A1 | 9/2000 | JP | 03086529 A | 4/1991 |
| EP | 1052012 | A1 | 11/2000 | JP | 03110445 A | 5/1991 |
| EP | 1349644 | B1 | 10/2003 | JP | 04108518 A | 4/1992 |
| EP | 1350555 | A1 | 10/2003 | JP | 04110023 A | 4/1992 |
| EP | 1236503 | B1 | 8/2004 | JP | 4-190889 | 7/1992 |
| EP | 1445240 | | 8/2004 | JP | 04187224 A | 7/1992 |
| EP | 1466658 | A1 | 10/2004 | JP | 4-256425 | 9/1992 |
| EP | 1659171 | A1 | 5/2006 | JP | 04250898 A | 9/1992 |
| EP | 1420874 | B1 | 1/2011 | JP | 04256424 A | 9/1992 |
| FR | 2620712 | A1 | 3/1989 | JP | 04265128 A | 9/1992 |
| FR | 2674448 | A1 | 10/1992 | JP | 04293527 A | 10/1992 |
| FR | 2699424 | A1 | 6/1994 | JP | 04310223 A | 11/1992 |
| FR | 2762834 | A1 | 11/1998 | JP | 04317793 A | 11/1992 |
| GB | 702911 | A | 1/1954 | JP | 04334530 A | 11/1992 |
| GB | 2253572 | A | 9/1992 | JP | 04348252 A | 12/1992 |
| JP | 52078677 | A | 7/1977 | JP | 05023557 A | 2/1993 |
| JP | 535077 | | 1/1978 | JP | 05096136 A | 4/1993 |
| JP | 54162684 | A | 12/1979 | JP | 05137977 A | 6/1993 |
| JP | 55099703 | A | 7/1980 | JP | 05157654 A | 6/1993 |
| JP | 55129107 | A | 10/1980 | JP | 05161831 A | 6/1993 |
| JP | 55129155 | A | 10/1980 | JP | 05279447 A | 10/1993 |
| JP | 56021604 | A | 2/1981 | JP | 05285348 A | 11/1993 |
| JP | 56118701 | A | 9/1981 | JP | 05305221 A | 11/1993 |
| JP | 56121685 | A | 9/1981 | JP | 06-027215 A | 2/1994 |
| JP | 57190697 | A | 11/1982 | JP | 06071120 A | 3/1994 |
| JP | 58088007 | A | 5/1983 | JP | 06114240 A | 4/1994 |
| JP | 60019002 | A | 1/1985 | JP | 06170364 A | 6/1994 |
| JP | 60-206412 | A | 10/1985 | JP | 06218237 A | 8/1994 |
| JP | 60260628 | A | 12/1985 | JP | 06277469 A | 10/1994 |
| JP | 61097005 | A | 5/1986 | JP | 06285496 A | 10/1994 |
| JP | 61097006 | A | 5/1986 | JP | 06343837 A | 12/1994 |
| JP | 61107905 | A | 5/1986 | JP | 07000770 A | 1/1995 |
| JP | 61167406 | A | 7/1986 | JP | 07024272 A | 1/1995 |
| JP | 61167407 | A | 7/1986 | JP | 07047247 A | 2/1995 |
| JP | 61171504 | A | 8/1986 | JP | 07068139 A | 3/1995 |
| JP | 61192309 | A | 8/1986 | JP | 07136470 A | 5/1995 |
| JP | 61222510 | A | 10/1986 | JP | 07136471 A | 5/1995 |
| JP | 61242607 | A | 10/1986 | JP | 07155564 A | 6/1995 |
| JP | 61249505 | A | 11/1986 | JP | 07155758 A | 6/1995 |
| JP | 61257203 | A | 11/1986 | JP | 7-39921 | 7/1995 |
| JP | 61263605 | A | 11/1986 | JP | 07178323 A | 7/1995 |
| JP | 61291007 | A | 12/1986 | JP | 07185268 A | 7/1995 |
| JP | 61293504 | A | 12/1986 | JP | 07185270 A | 7/1995 |
| JP | 62004408 | A | 1/1987 | JP | 07185271 A | 7/1995 |
| JP | 62068828 | A | 3/1987 | JP | 07185272 A | 7/1995 |
| JP | 62114609 | A | 5/1987 | JP | 07236819 A | 9/1995 |
| JP | 62140607 | A | 6/1987 | JP | 07-256253 | 10/1995 |
| JP | 62144708 | A | 6/1987 | JP | 07251043 A | 10/1995 |
| JP | 62163708 | A | 7/1987 | JP | 07275665 A | 10/1995 |
| JP | 62179540 | A | 8/1987 | JP | 07289860 A | 11/1995 |
| JP | 62237908 | A | 10/1987 | JP | 07303895 A | 11/1995 |
| JP | 62250908 | A | 10/1987 | JP | 07313973 A | 12/1995 |
| JP | 62187606 | | 11/1987 | JP | 08010585 A | 1/1996 |
| JP | 62262710 | A | 11/1987 | JP | 08323161 A | 12/1996 |
| JP | 63097634 | A | 4/1988 | JP | 08332357 A | 12/1996 |
| JP | 63099246 | A | 4/1988 | JP | 09000890 A | 1/1997 |
| JP | 63143905 | A | 6/1988 | JP | 09038470 A | 2/1997 |
| JP | 63171607 | A | 7/1988 | JP | 09072993 A | 3/1997 |
| JP | 63180254 | A | 7/1988 | JP | 09099227 A | 4/1997 |
| JP | S63-38884 | | 10/1988 | JP | 9103661 | 4/1997 |
| JP | 64-075542 | A | 3/1989 | JP | 09141063 A | 6/1997 |
| JP | 1-501046 | T | 4/1989 | JP | 09155345 A | 6/1997 |
| JP | 01151906 | A | 6/1989 | JP | 09187628 A | 7/1997 |
| JP | 01-307409 | A | 12/1989 | JP | 09192458 A | 7/1997 |
| JP | 02017924 | | 1/1990 | JP | 09220569 A | 8/1997 |
| JP | 02017925 | | 1/1990 | JP | 09271641 A | 10/1997 |
| JP | 02026625 | A | 1/1990 | JP | 09324067 A | 12/1997 |
| JP | 02031200 | A | 2/1990 | JP | 10024222 A | 1/1998 |
| JP | 02040296 | A | 2/1990 | JP | 10033955 A | 2/1998 |
| JP | 02107318 | A | 4/1990 | JP | 10048466 A | 2/1998 |
| JP | 02126922 | A | 5/1990 | JP | 10076144 A | 3/1998 |
| JP | 02144132 | A | 6/1990 | JP | 10076264 A | 3/1998 |
| JP | 02164423 | A | 6/1990 | JP | 10085562 A | 4/1998 |
| JP | 02174918 | A | 7/1990 | JP | 10085565 A | 4/1998 |
| JP | 02241523 | A | 9/1990 | JP | 10156149 A | 6/1998 |
| JP | 02277528 | A | 11/1990 | JP | 10180048 A | 7/1998 |

| | | | | | | |
|---|---|---|---|---|---|---|
| JP | 10225685 A | 8/1998 | NZ | 510394 A | 5/2003 |
| JP | 10235168 A | 9/1998 | NZ | 537874 A | 2/2007 |
| JP | 10286441 A | 10/1998 | TW | 347343 | 12/1998 |
| JP | 10328538 A | 12/1998 | WO | 8800494 A1 | 1/1988 |
| JP | 11005023 A | 1/1999 | WO | 8801529 A1 | 3/1988 |
| JP | 11028467 A | 2/1999 | WO | 8801895 A1 | 3/1988 |
| JP | 11031025 A | 2/1999 | WO | 8806200 A1 | 8/1988 |
| JP | 11033365 A | 2/1999 | WO | 8900880 A1 | 2/1989 |
| JP | 11033367 A | 2/1999 | WO | 9000434 A1 | 1/1990 |
| JP | 11076769 A | 3/1999 | WO | 9104783 A1 | 4/1991 |
| JP | 11156166 A | 6/1999 | WO | 9116124 A1 | 10/1991 |
| JP | 11156360 A | 6/1999 | WO | 9302779 A1 | 2/1993 |
| JP | 11165200 A | 6/1999 | WO | 9315827 A1 | 8/1993 |
| JP | 11-179171 A | 7/1999 | WO | 9323152 A1 | 11/1993 |
| JP | 11302438 A | 11/1999 | WO | 9411094 A1 | 5/1994 |
| JP | 11319501 A | 11/1999 | WO | 9534424 A1 | 12/1995 |
| JP | 11319507 A | 11/1999 | WO | 9603202 A1 | 2/1996 |
| JP | 11333265 A | 12/1999 | WO | 9607470 A1 | 3/1996 |
| JP | 2000000439 A | 1/2000 | WO | 9628236 A1 | 9/1996 |
| JP | 2000051669 A | 2/2000 | WO | 9641676 A1 | 12/1996 |
| JP | 2000061466 A | 2/2000 | WO | 9706880 A2 | 2/1997 |
| JP | 200079390 A | 3/2000 | WO | 9822204 A1 | 5/1998 |
| JP | 2000070684 A | 3/2000 | WO | 9825694 A1 | 6/1998 |
| JP | 2000-093758 | 4/2000 | WO | 9828066 A1 | 7/1998 |
| JP | 2000-157845 | 6/2000 | WO | 9853902 A1 | 12/1998 |
| JP | 2000157850 A | 6/2000 | WO | 9901207 A1 | 1/1999 |
| JP | 2000185220 A | 7/2000 | WO | 99-55448 A1 | 11/1999 |
| JP | 2000189958 A | 7/2000 | WO | 9959707 A1 | 11/1999 |
| JP | 2000233020 A | 8/2000 | WO | 0018498 A1 | 4/2000 |
| JP | 2000237548 A | 9/2000 | WO | 0030742 A1 | 6/2000 |
| JP | 2000300968 A | 10/2000 | WO | 0100307 A2 | 1/2001 |
| JP | 2000317276 A | 11/2000 | WO | 0105715 A1 | 1/2001 |
| JP | 2000342932 A | 12/2000 | WO | 0108790 A1 | 2/2001 |
| JP | 2001009246 A | 1/2001 | WO | 0119414 A1 | 3/2001 |
| JP | 2001070967 A | 3/2001 | WO | 0132299 A1 | 5/2001 |
| JP | 2001079366 A | 3/2001 | WO | 0136075 A1 | 5/2001 |
| JP | 2001079367 A | 3/2001 | WO | 0143856 A1 | 6/2001 |
| JP | 2001104760 A | 4/2001 | WO | 0145829 A1 | 6/2001 |
| JP | 2001120963 A | 5/2001 | WO | 0226363 A2 | 4/2002 |
| JP | 2001179059 A | 7/2001 | WO | 0230550 A1 | 4/2002 |
| JP | 2001179060 A | 7/2001 | WO | 0240140 A1 | 5/2002 |
| JP | 2001190937 A | 7/2001 | WO | 0247800 A1 | 6/2002 |
| JP | 2001190938 A | 7/2001 | WO | 03000389 A2 | 1/2003 |
| JP | 2001205055 A | 7/2001 | WO | 03013706 A1 | 2/2003 |
| JP | 2001510396 T | 7/2001 | WO | 03024575 A1 | 3/2003 |
| JP | 2001269546 | 10/2001 | WO | 03053552 A1 | 7/2003 |
| JP | 2002177746 A | 6/2002 | WO | 03057632 A1 | 7/2003 |
| JP | 3302992 B2 | 7/2002 | WO | 03059495 A1 | 7/2003 |
| JP | 2002525197 T | 8/2002 | WO | 03068374 A1 | 8/2003 |
| JP | 2002527229 A | 8/2002 | WO | 03095078 A1 | 11/2003 |
| JP | 2002263407 A | 9/2002 | WO | 2004018084 A1 | 3/2004 |
| JP | 2002336663 | 11/2002 | WO | 2004024304 A2 | 3/2004 |
| JP | 2003024751 | 1/2003 | WO | 2004033078 A1 | 4/2004 |
| JP | 2003047830 A | 2/2003 | WO | 2004050221 A1 | 6/2004 |
| JP | 2003053160 A | 2/2003 | WO | 2004056458 A3 | 7/2004 |
| JP | 200371254 A | 3/2003 | WO | 2004078327 A1 | 9/2004 |
| JP | 2003062436 A | 3/2003 | WO | 2004101120 A1 | 11/2004 |
| JP | 2003135935 A | 5/2003 | WO | 2005005028 A1 | 1/2005 |
| JP | 2003190976 A | 7/2003 | WO | 2005021140 A1 | 3/2005 |
| JP | 2003265597 | 9/2003 | WO | 2005028085 A1 | 3/2005 |
| JP | 2003266072 A | 9/2003 | WO | 2005028086 A1 | 3/2005 |
| JP | 2003275548 A | 9/2003 | WO | 2005037414 A1 | 4/2005 |
| JP | 2003275759 A | 9/2003 | WO | 2005046849 A1 | 5/2005 |
| JP | 2003340250 A | 12/2003 | WO | 2005077499 A1 | 8/2005 |
| JP | 2004008981 | 1/2004 | WO | 2005082498 A1 | 9/2005 |
| JP | 2004230280 A | 8/2004 | WO | 2005107929 A2 | 11/2005 |
| JP | 2004230287 A | 8/2004 | WO | 2006026814 A1 | 3/2006 |
| JP | 2004337730 A | 12/2004 | WO | 2006029456 A1 | 3/2006 |
| JP | 2005144291 A | 6/2005 | WO | 2006029465 | 3/2006 |
| JP | 2005154551 A | 6/2005 | WO | 2006047814 A1 | 5/2006 |
| JP | 2005279447 A | 10/2005 | WO | 2006066350 A1 | 6/2006 |
| JP | 2006116495 | 5/2006 | WO | 2007053528 A2 | 5/2007 |
| JP | 2007547083 | 8/2010 | WO | WO 2007065956 A1 | 6/2007 |
| KR | 2002-0090967 | 12/2002 | WO | 2007135087 A1 | 11/2007 |
| KR | 2003-033812 | 5/2003 | WO | 2008034570 A1 | 3/2008 |
| KR | 2003-060625 | 7/2003 | WO | 2008153818 A1 | 12/2008 |
| KR | 2005-063478 | 6/2005 | WO | 2009030405 A1 | 3/2009 |
| NL | 1020491 C | 10/2003 | | | |
| NL | 1021197 C | 10/2003 | | | |

OTHER PUBLICATIONS

Almulla et al., Desalination, 153 (2002), pp. 237-243.
Anonymous, "Nonwoven Constructions of Dyneon" THV and Dyneon "THE Fluorothermoplastics", Research Disclosure Journal, Apr. 1999, RD 420013, 2 pages.
Canadian Office Action dated May 17, 2011 for Application No. 2,682,707.
Cote et al. "A New Immersed Membrane for Pretreatment to Reverse Osmosis" Desalination 139 (2001) 229-236.
Cote et al., Wat. Sci. Tech. 38(4-5) (1998), pp. 437-442.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk-Othmer Encyclopedia of Chemical Technology, Peroxides and Peroxy Compounds, Inorganic, to Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwm-mrw.interscience.wiley.com/eow/.
Webster's Ninth New Collegiate Dictionary, Merriam-Webster Inc., Publishers, Springfield, Massachusetts, USA, Copyright 1986, p. 1298.
White et al., The Chemical Engineering Journal, 52 (1993), pp. 73-77.
Wikipedia, "Seawater," available at http://en.wikipedia.org/wiki/Seawater, Jul. 15, 2007.
Yamamoto et al., Water Science Technology, vol. 2, pp. 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-99," Mar. 2000, entire publication.
International Preliminary Report on Patentability and Written Opinion dated Oct. 6, 2009 for corresponding Application No. PCT/AU2008/004224.
International Search Report dated Aug. 21, 2008 for Application No. PCT/AU2008/004224.

* cited by examiner

INFILTRATION/INFLOW CONTROL FOR MEMBRANE BIOREACTOR

CROSS REFERENCE TO RELATED APPLICATIONS

This application is a U.S. national stage application and claims the benefit under 35 U.S.C. §371 of International Application No. PCT/US2008/004224 filed on Apr. 1, 2008, entitled IMPROVED INFILTRATION/INFLOW CONTROL FOR MEMBRANE BIOREACTOR, which claims priority under 35 U.S.C. §119(e) to U.S. Provisional Application Ser. No. 60/909,552 filed Apr. 2, 2007, entitled INFILTRATION/INFLOW CONTROL FOR MEMBRANE BIOREACTOR, each of which is entirely incorporated herein by reference for all purposes, and to which this application claims the benefit of priority.

BACKGROUND OF INVENTION

1. Field of Invention

The present invention relates to a system and method for treating wastewater, and more particularly to a wastewater treatment system and method utilizing a membrane bioreactor.

2. Discussion of Related Art

The importance of membrane for treatment of waste water is growing rapidly. With the arrival of submerged membrane processes where membrane modules are immersed in a large feed tank and filtrate is collected typically through suction applied to the filtrate side of the membrane, membrane bioreactors (MBRs) combining biological and physical processes in one stage promise to be more compact, efficient and economic. Membrane bioreactors are typically sized to accommodate community and large-scale sewage treatment. A need has been found for these systems to periodically handle large flows of influent caused by peak rain events during storms and the like. Further a need has found to provide a system which automatically compensates for such large flows of influent.

SUMMARY OF INVENTION

In accordance with one or more embodiments, the invention relates to a system and method of treating wastewater.

In one embodiment, a wastewater treatment system includes a first treatment zone fluidly connected to one or more further treatment zones. A membrane module comprising a filter membrane is positioned in or fluidly connected to the further treatment zone. A gravity settling device is fluidly connected to the first treatment zone to receive overflow therefrom. A flow control device is positioned between the first treatment zone and the gravity settling device to control the flow of liquid therebetween.

Another embodiment is directed to a method of treating wastewater which includes flowing a wastewater through one or more treatment zones to produce a fluid product which is passed through a filter membrane to produce a concentrated mixed liquor and a filtrate, returning at least a portion of the concentrated mixed liquor to at least one of said treatment zones, when the flow of wastewater exceeds a predetermined level, flowing a portion of said returned mixed liquor to a gravity settling device, clarifying the mixed liquor within the gravity settling device and controlling the size of the portion of returned mixed liquor in dependence on the flow of wastewater.

The control of flow of excess influent to the gravity settling device may be performed using a variety of arrangements. The flow of liquid between treatment zones and the filter membrane would typically be controlled by pumps operating in response to the liquid level in the first treatment zone or furthest upstream treatment zone. In one embodiment, the flow of liquid is regulated by a weir in the first or furthest upstream treatment zone. If the influent flow rate is higher than what the filter membrane can handle, the liquid level in the first treatment zone will rise and liquid will start to flow over the weir and flow to the gravity-settling device or devices.

The weir may be a fixed weir but other embodiments may include a weir whose height is manually adjustable, or automatically adjustable based on an influent flow meter signal or other process measurement. Other embodiments of the invention may also use valves, gates, or other like devices to regulate the flow split between the gravity settling device(s) and the membrane filter.

Another embodiment of the invention provides flow of feed liquid by gravity to the membrane filter and a pump for return of excess liquid back to the biological process zones. In this embodiment an adjustable weir, gate, valve or other like device is provided to restrict the flow to the membrane filter resulting in the liquid levels in the upstream treatment zones increasing to a level where the excess inflow is diverted to the gravity settling device.

Another embodiment of the invention controls the split between the amount of mixed liquor from the membrane filter which is returned to the upstream treatment zones and thus to the gravity-settling device and the amount of returned mixed liquor which is fed to the downstream treatment zones and eventually to feed side of the membrane filter.

One preferred method of controlling the liquid flow split between the upstream and downstream treatment zones is to measure the influent flow rate to the system and the feed flow being treated by the membrane filter to calculate the proportion of the total flow being treated by the gravity-settling device(s). The desired percentage of returned mixed liquor to be sent via the upstream treatment zones to the gravity-settling device(s) can then be calculated by a Programmed Logic Controller (PLC) or like device using a mass balance equation to determine the flow split required to maintain the required Mixed Liquor Suspended Solids (MLSS) concentration in the liquid flow being transferred to the gravity-settling device(s).

The mass balance equation may be a function of at least four variables: —

1) the average Total Suspended Solids (TSS) concentration in the mixed liquor. This can be provided by user input or measured with TSS probes.

2) the desired MLSS concentration in the upstream treatment zones (which may be verified with a TSS probe).

3) the influent flow to the treatment process, and 4) the percentage of that flow being treated by the gravity settling device(s).

Preferably, the process may use multiple treatment zones in series, with the ability to maintain different food to microorganism ratios and different dissolved oxygen concentrations in each treatment zone. For preference, the sludge separated from the mixed liquor in the gravity settling device is returned to a treatment zone downstream of the treatment zone feeding the gravity settling device.

BRIEF DESCRIPTION OF DRAWINGS

A preferred embodiment of the invention will now be described, by way of example only, with reference to the accompanying drawing in which.

DETAILED DESCRIPTION

Figure 1:
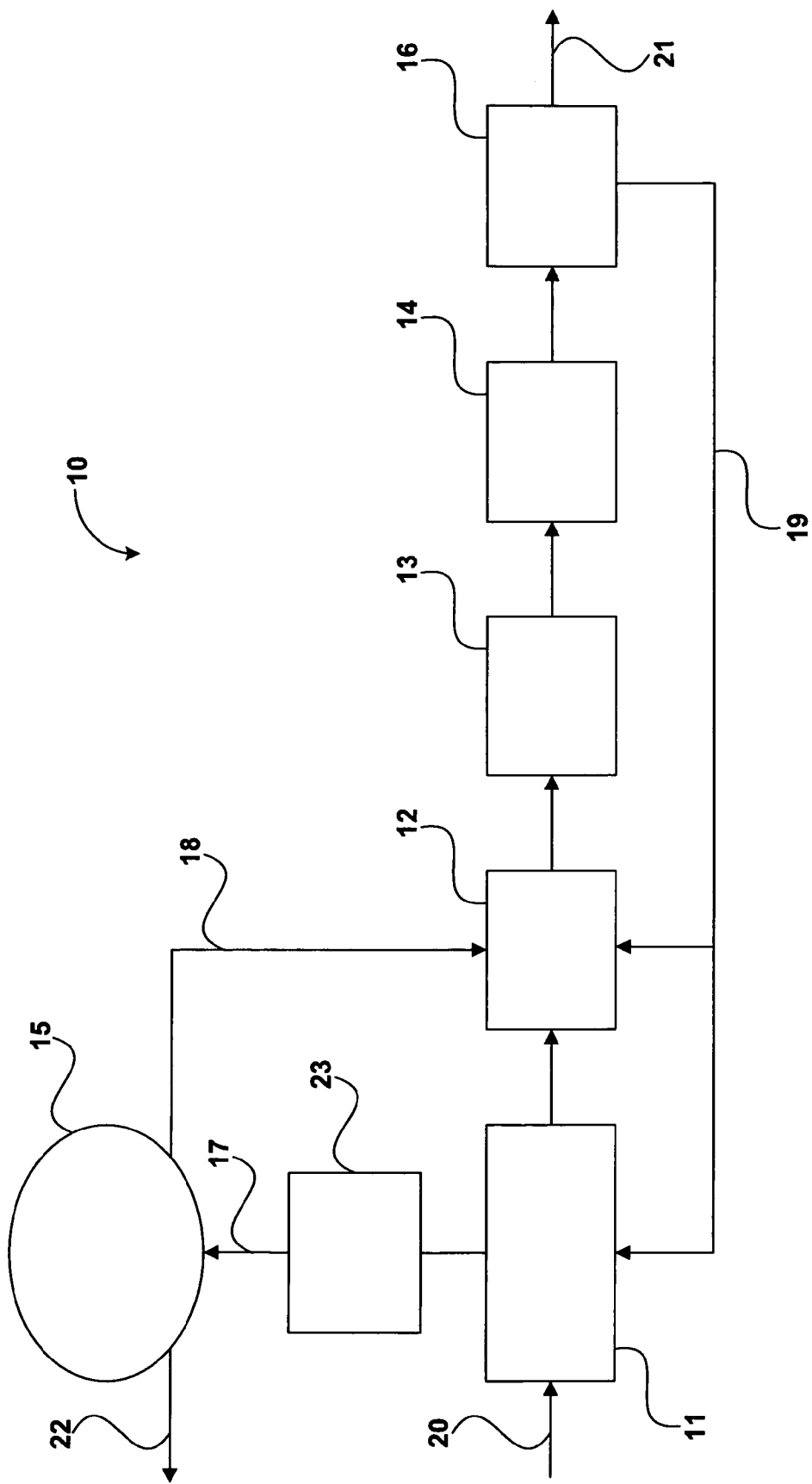
FIG. 1 shows a schematic representation of a system in accordance with one embodiment of the invention.

This invention is not limited in its application to the details of construction and the arrangement of components set forth in the following description or illustrated in the drawing. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

This invention may be directed to wastewater treatment systems utilizing membrane bioreactors designed to treat wastewater flows as low as 25,000 gallons per day, or peak flows as high as about 100 million gallons per day (MGD) or greater. In one embodiment the wastewater treatment system is designed to treat an average flow of 12 MGD and a peak wastewater flow of about 30 MGD. It will be appreciated these flow volumes are merely exemplary and in no way intended to restrict the application of the invention which may be applied over a much wider range of flow.

"Wastewater," as used herein, defines a stream of waste from a residential or community source, having pollutants of biodegradable material, inorganic or organic compounds capable of being decomposed by bacteria, flowing into the wastewater treatment system. As used herein, a "wastewater treatment system" is a system, typically a biological treatment system, having a biomass population of bacterial microorganisms of a diversity of types of bacteria, used to digest biodegradable material. Notably, the biomass requires an environment that provides the proper conditions for growth.

One embodiment of the present invention includes bioreactor having one or more treatment zones. As used herein, the phrase "treatment zone" is used to denote an individual treatment region. Individual treatment regions may be housed in a single vessel with one or more compartments. Alternatively, individual treatment regions may be housed in separate vessels, wherein a different treatment is carried out in separate vessels. The treatment zone, i.e. the vessel or compartment, may be sized and shaped according to a desired application and volume of wastewater to be treated.

The wastewater treatment system may include a fluidizable media housed in a first treatment zone. The fluidizable media may comprise biomass carriers designed to immobilize anoxic organisms. The biomass carriers may be formed of any material suitable to support organisms and to remain fluidized under operating conditions. In one embodiment, the fluidizable media has a specific gravity substantially the same as that of water. In another embodiment the fluidizable media has a surface area adequate to allow denitrifying bacteria to grow, which may enhance the efficiency of the anoxic reaction to remove nitrogen.

Any volume of fluidizable media may be utilized within the first treatment zone for a particular purpose. For example, a maximum volume of fluidized media may be used to substantially fill the first treatment zone, or a lesser volume of fluidized material may be used to fill a portion of the first treatment zone.

According to one embodiment of the invention, one or more porous or permeable membranes may be used to treat fluid flow from treatment zones and in some embodiments may be positioned within a treatment zone. The membrane may have any configuration suitable for a particular purpose, such as sheet or hollow tube. The membrane may be formed of any material (natural or synthetic) suitable for a particular filtration process. In one embodiment, the membrane is formed of polymeric hollow fibers.

One or more membranes may be positioned in one or more membrane modules. The membrane modules may have any shape and cross sectional area suitable for use in a desired application, for example, square, rectangular, or cylindrical. In one embodiment, the membrane modules are rectangular.

According to one embodiment, one or more membrane modules may be positioned in a treatment zone in such a way as to be completely submerged by fluid during operation. For example, the membrane module may be positioned vertically, horizontally, or at an angle within the second treatment zone. Multiple membrane modules may be positioned adjacent one another, or located at predetermined positions within the second treatment zone and may, but need not, be positioned in the same plane as others or parallel to one another. In one embodiment, hollow fiber membranes may be positioned horizontally within the treatment zone. One or more membrane modules may be mounted directly to the vessel or compartment which forms a treatment zone. Alternatively, one or more membrane modules may be mounted to a module support which may be removably attached to the vessel or compartment forming the treatment zone. In one embodiment, a plurality of membrane modules are mounted to a module support rack to facilitate membrane maintenance and/or replacement. In another embodiment, membrane modules having vertical partitions may be positioned horizontally.

The treatment zone may include an aeration system to suspend solids in wastewater or resultant concentrated mixed liquor contained within the second treatment zone, and/or to assist water transfer through the membrane. The aeration system may produce fine bubbles, coarse bubbles, a jet stream of gas, a jet of gas and fluid, and combinations thereof. The aeration system may be positioned in any suitable location within the treatment zone. In one embodiment, aeration may be provided along a length of one or more membrane modules horizontally positioned.

According to another embodiment, the wastewater treatment system may include one or more pretreatment units, such as to collect solids and/or to remove phosphorous. In one embodiment the pretreatment unit is a trap to remove floating solids, such as grease, and other gross organic solids until they become more soluble, and is positioned upstream of the first treatment zone. The trap may be sized to provide a volume of about 1×FF (1 forward feed). In another embodiment, the pretreatment unit is a chemical phosphorous removal unit.

According to another embodiment, the wastewater treatment system may further include an equalization tank and/or a reserve storage tank fluidly connected to the bioreactor. The tank may be sized to accommodate fluctuations in wastewater generation to normalize flow into the bioreactor. For example, the equalization capacity may be equal to about 8 hours or about 33% of the FF. The same tank may also be sized to provide reserve capacity for an emergency such as a power failure, and may have a reserve capacity of about 16 hours or about 67% of the FF. In one embodiment, the tank is sized to provide a volume of about 1×FF to provide for equalization and a reserve.

Referring to the FIG. 1 there is illustrated one embodiment of the present wastewater treatment system. The figure shows a bioreactor 10 comprising a number of treatment tanks 11 to 14 connected in series with the same or different environments maintained in each tank and a membrane filter 16 connected thereto. The tanks are fluidly coupled in series to each other. Possible environments in the tanks could include anaerobic, anoxic, aerated anoxic, or aerobic depending on the effluent water quality requirements for each specific application. A clarifier 15 is fluidly connected to tanks 11 and 12 by fluid inflow line 17 and fluid outflow line 18. A flow control device 23 is provided between tank 11 and the clarifier 15 to control the flow of liquid therebetween. A fluid feedback line 19 is provided from the feed side of the membrane filter 16 to tanks 11 and 12. Wastewater is fed into the bioreactor 10 through influent line 20. Effluent is withdrawn from the bioreactor 10 through effluent line 21 coupled to the filtrate side of the membrane filter 16. Clarifier effluent is flowed from the clarifier 15 through clarifier effluent line 22.

In one mode of operation, during average inflow conditions, the inflow to tank 11 is the average design flow rate Q and all flow is directed through the treatment tanks to the membrane filter 16. A portion of the mixed liquor, typically a flow equal to around 2 to 8 times the average design flow, Q, is returned to treatment tank 11. In this mode of operation no overflow is provided to clarifier 15 from tank 11 and there is no feedback of mixed liquor to tank 12.

In a second mode of operation, during wet weather or high inflow conditions, a portion of the mixed liquor flow (typically a flow equal to around 1 to 4 times the average design flow, Q) into tank 11 is diverted to the clarifier 15 under the control of flow control device 23 through inflow line 17 with the remainder flowing from tank 11 to tank 12. The mixed liquor feedback from the membrane filter 16 to tank 11 is also reduced (typically to about 0.5 to 2 times the average design flow, Q) by diverting a portion of the flow to tank 12. The flow from tank 11 into the clarifier 15 is selected to allow reliable gravity settling of solids material within the clarifier 15.

The flow control device 23, as described above, may include pumps, valves, weirs, gates or like control devices responsive the level of inflow to the system to control the split of flow from tank 11 between the clarifier 15 and the downstream tank 12. If a weir is used, it would typically be positioned within or adjacent to the upstream tank 11.

Activated sludge is returned from the clarifier 15 through outflow line 18 to tank 12 (typically a flow equal to about 0.25 to 1 times the average design flow, Q). Clarified effluent is withdrawn from the clarifier 15 through clarifier effluent line 22.

Figure 2:
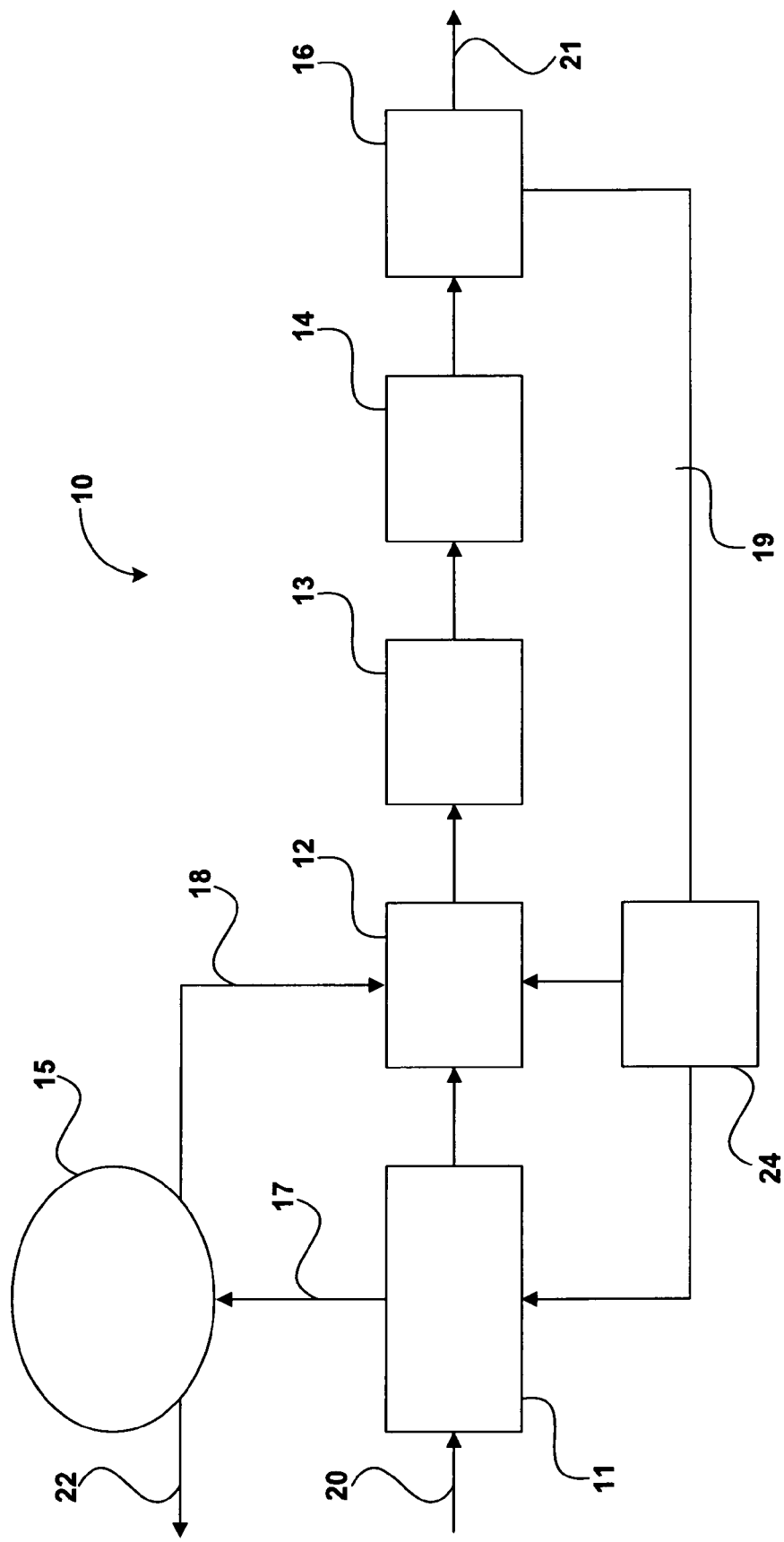
FIG. 2 shows a schematic representation of a system in accordance with another embodiment of the invention.

A further embodiment of the invention is shown in FIG. 2. It will be appreciated this embodiment could also be used in combination with the arrangement shown in FIG. 1.

In this embodiment the treatment system is similar to that of the first embodiment with the addition of the flow control device 24 positioned to control of the flow of feedback liquid from the membrane filter 16 into tanks 11 and 12.

The flow control device 24 controls the liquid flow split between the upstream tank 11 and the downstream tank 12 by measuring the influent flow rate and the feed flow being treated by the membrane filter 16 to calculate the proportion of the total flow being treated by the clarifier 15. The desired percentage of returned mixed liquor to be sent via the upstream tank 11 to the clarifier 15 is calculated by a Programmed Logic Controller (PLC) or like device using a mass balance equation to determine the flow split required to maintain the required Mixed Liquor Suspended Solids (MLSS) concentration in the liquid flow being transferred to the clarifier 15.

The mass balance equation typically is a function of at least four variables: —
1) The average Total Suspended Solids (TSS) concentration in the mixed liquor. This can be provided by user input or measured with TSS probes.
2) The desired MLSS concentration in the upstream treatment tank(s) (which may be verified with a TSS probe).
3) The influent flow to the treatment process, and
4) The percentage of that flow being treated by the clarifier (s).

Again, the flow control device 24 may include pumps, valves, weirs, gates or the like liquid flow control devices.

Figure 3:
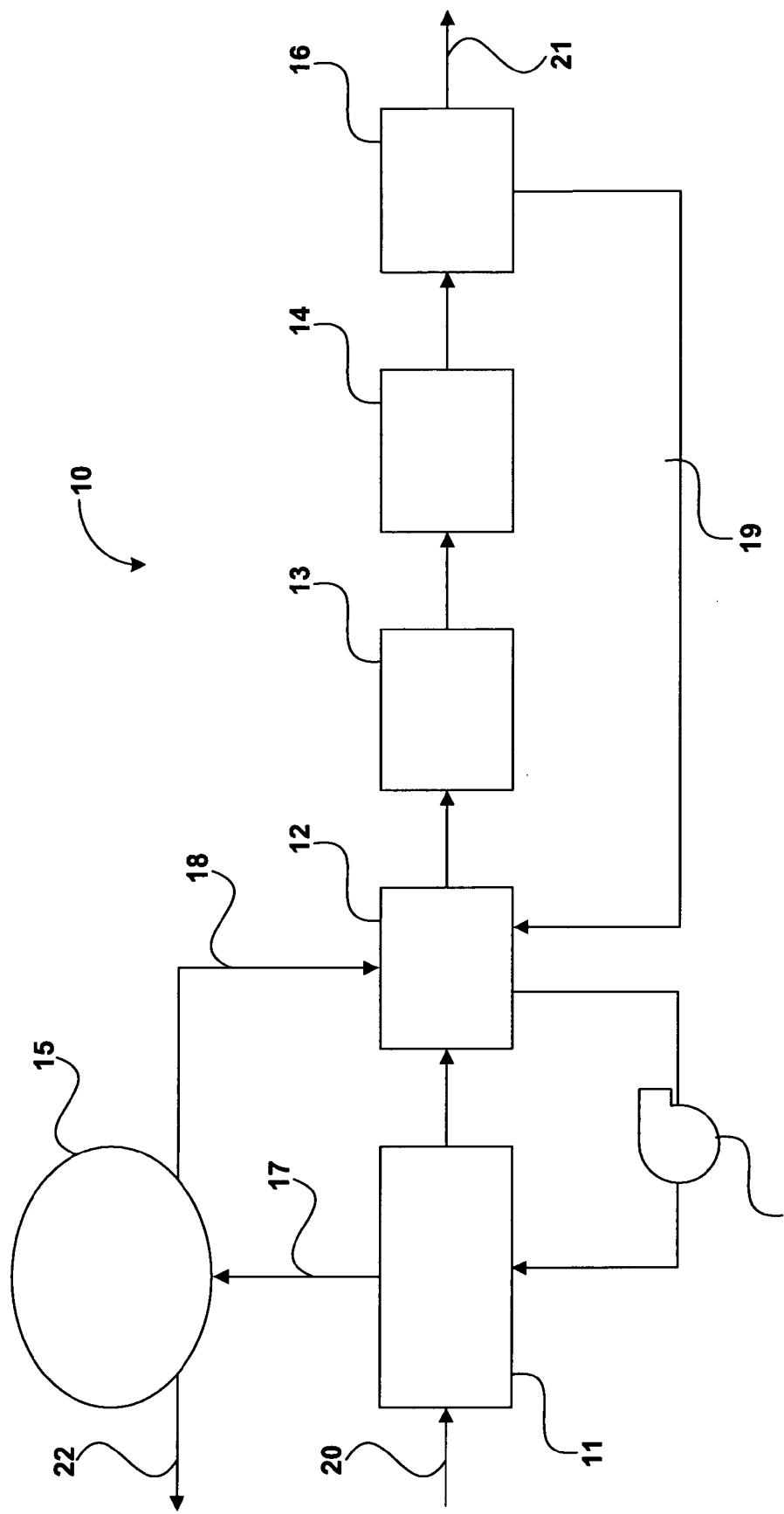
FIG. 3 shows a schematic representation of a system in accordance with another embodiment of the invention.

A further embodiment of the invention is shown in FIG. 3. In this embodiment the treatment system is similar to that of the first two embodiments, except that 100% of the overflow in feedback line 19 is returned to reactor 12, with the flow rate of pump 25 being used to control the mixed liquor suspended solids concentration in reactor 11.

The flow rate of pump 25 is adjusted to correspondingly control the mixed liquor solids concentration in reactor 11. For example, in some cases this includes measuring the influent flow rate, the flow rate of pump 25, and the feed flow being treated by the membrane filter 16, thereby to calculate the proportion of the total flow being treated by the clarifier 15. The desired percentage of returned mixed liquor to be sent via the upstream tank 11 to the clarifier 15 is in some cases calculated by a Programmed Logic Controller (PLC) or similar device, preferably by way of a mass balance equation. It will be appreciated that such an equation is appropriate for determining the flow split required to maintain the required Mixed Liquor Suspended Solids (MLSS) concentration in the liquid flow being transferred to the clarifier 15.

The mass balance equation typically is a function of at least four variables, including:
1) The average Total Suspended Solids (TSS) concentration in the mixed liquor. This can be provided by user input or measured with TSS probes.
2) The desired MLSS concentration in the upstream treatment tank(s) (which may be verified with a TSS probe).
3) The influent flow to the treatment process, and
4) The percentage of that flow being treated by the clarifier (s).

Again, the flow control device 24 may include pumps, valves, weirs, gates or the like liquid flow control devices.

Accordingly, the invention provides an efficient and automatic means of dealing with large inflows without compromising the operation of the membrane bioreactor.

Accordingly, the invention provides an efficient and automatic means of dealing with large inflows without compromising the operation of the membrane bioreactor.

Having thus described several aspects of at least one embodiment of this invention, it should be apparent to those skilled in the art that the foregoing is merely illustrative and not limiting, having been presented by way of example only. Numerous modification and other embodiments are within the scope of the invention. In particular, although many embodiments presented herein involve specific combinations of method acts or system elements, it should be understood that those acts and those elements may be combined in other ways to accomplish the same objectives.

Further, acts, elements, and features discusses only in connection with one embodiment are not intended to be excluded from a similar role in other embodiments.

It is to be appreciated that various alterations, modifications, and improvements can readily occur to those skilled in the art ant that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, and/or method, if such features, systems, subsystems, and techniques are not mutually inconsistent, is considered to be within the scope of the invention as described.

Those skilled in the art should appreciate that the parameters and configuration described herein are exemplary and that actual parameters and/or configurations will depend on the specific application in which the systems and techniques of the invention are used. Those skilled in the art should also recognize or be able to ascertain, using no more than routing experimentation, equivalents to the specific embodiments of the invention. It is therefore to be understood that the embodiments described herein are presented by way of example only and that, within the scope of the invention described and equivalents thereto; the invention may be practiced otherwise than as specifically described

The invention claimed is:

1. A method of treating wastewater comprising:
   flowing wastewater through one or more treatment zones to produce a fluid product;
   passing the fluid product through a filter membrane to produce a concentrated mixed liquor and a filtrate;
   returning at least a portion of the concentrated mixed liquor to at least one of the one or more treatment zones;
   flowing a portion of the returned mixed liquor to a gravity settling device over a weir having an adjustable height in a furthest upstream of the one or more treatment zones when a flow rate of the wastewater exceeds a predetermined level;
   clarifying the portion of the returned mixed liquor within the gravity settling device; and
   controlling a quantity of the portion of the returned mixed liquor in dependence on the flow rate of the wastewater.

2. The method of claim 1, further comprising controlling a flow of the fluid product between the one or more treatment zones and the filter membrane by one or more pumps operating in response to a liquid level in the furthest upstream treatment zone.

3. The method of claim 1, further comprising returning sludge separated from the mixed liquor in the gravity settling device to a treatment zone downstream of the furthest upstream treatment zone.

4. A method of treating wastewater comprising:
   flowing wastewater through one or more treatment zones to produce a fluid product;
   passing the fluid product through a filter membrane to produce a concentrated mixed liquor and a filtrate;
   returning at least a portion of the concentrated mixed liquor to at least one of the one or more treatment zones;
   flowing a portion of the returned mixed liquor to a gravity settling device when a flow rate of the wastewater exceeds a predetermined level;
   clarifying the portion of the returned mixed liquor within the gravity settling device;
   controlling a quantity of the portion of the returned mixed liquor in dependence on the flow rate of the wastewater; and
   controlling a ratio between an amount of the mixed liquor from the membrane filter which is returned to upstream treatment zones of the one or more treatment zones and an amount of the mixed liquor from the membrane filter which is returned to downstream treatment zones of the one or more treatment zones and to a feed side of the membrane filter.

5. The method of claim 4, further comprising controlling a flow of the fluid product between the one or more treatment zones and the filter membrane by a weir in a furthest upstream of the one or more treatment zones.

6. The method of claim 5, wherein the weir is a fixed weir.

7. The method of claim 5, wherein a height of the weir is adjustable.

8. The method of claim 7, wherein the height of the weir is automatically adjustable based on one of an influent flow meter signal and an other process measurement.

9. The method of claim 4, comprising controlling the ratio between the amount of mixed liquor which is returned to the upstream treatment zones and the amount of the mixed liquor which is returned to the downstream treatment zones based on a calculation of a proportion of a total flow being treated by the gravity-settling device.

10. The method of claim 9, wherein a portion of returned mixed liquor to be sent via the upstream treatment zones to the gravity-settling device is calculated by a programmable control device using a mass balance equation to determine a ratio of the liquid flow required to maintain a required Mixed Liquor Suspended Solids (MLSS) concentration in a liquid flow being transferred to the gravity-settling device.

11. The method of claim 10, wherein the mass balance equation is a function of one or more of:
    an average Total Suspended Solids (TSS) concentration in the mixed liquor;
    a desired MLSS concentration in the upstream treatment zones;
    a total influent flow to the treatment process; and
    a percentage of that flow being treated by the gravity settling device.

12. A wastewater treatment system comprising:
    a plurality of treatment zones including a first treatment zone fluidly connected to one or more further treatment zones;
    a membrane module comprising a filter membrane positioned in or fluidly connected to one of the one or more further treatment zone;
    a gravity settling device fluidly connected to the first treatment zone to receive overflow therefrom;
    a weir having an adjustable height in the first treatment zone, wherein a flow of liquid between the plurality of treatment zones and the filter membrane is controlled by the weir; and
    a flow control device between the first treatment zone and the gravity settling device to control the flow of liquid therebetween.

13. The wastewater treatment system of claim 12, further comprising one or more pumps operable in response to a liquid level in the first treatment zone to control a flow of liquid between the plurality of treatment zones and the filter membrane.

14. The wastewater treatment system of claim 12, further comprising means for returning sludge separated from the mixed liquor in the gravity settling device to a treatment zone downstream of the first treatment zone.

15. A wastewater treatment system comprising:
    a plurality of treatment zones including a first treatment zone fluidly connected to one or more further treatment zones;

a membrane module comprising a filter membrane positioned in or fluidly connected to one of the one or more further treatment zone;

a gravity settling device fluidly connected to the first treatment zone to receive overflow therefrom;

a flow control device between the first treatment zone and the gravity settling device to control a flow of liquid therebetween; and control means for controlling a ratio between an amount of mixed liquor from the filter membrane which is returned to upstream treatment zones of the plurality of treatment zones and an amount of mixed liquor from the filter membrane which is returned to downstream treatment zones of the plurality of treatment zones and to a feed side of the membrane filter.

16. The wastewater treatment system of claim 15, further comprising a weir in the first treatment zone, wherein a flow of liquid between the plurality of treatment zones and the filter membrane is controlled by the weir.

17. The wastewater treatment system of claim 16, wherein the weir is a fixed weir.

18. The wastewater treatment system of claim 16, wherein a height of the weir is adjustable.

19. The wastewater treatment system of claim 18, wherein the height of the weir is automatically adjustable based on one of an influent flow meter signal and an other process measurement.

20. The wastewater treatment system of claim 15, wherein the control means controls a ratio between the amount of mixed liquor which is returned to the upstream treatment zones and the amount of the mixed liquor which is returned to the downstream treatment zones based on a calculation of a proportion of a total flow being treated by the gravity-settling device.

21. The wastewater treatment system of claim 20, wherein an amount of returned mixed liquor to be sent via the upstream treatment zones to the gravity-settling device is calculated by a programmable control device using a mass balance equation to determine the ratio of the liquid flow required to maintain a required Mixed Liquor Suspended Solids (MLSS) concentration in a liquid flow being transferred to the gravity-settling device.

22. The wastewater treatment system of claim 21, wherein the mass balance equation is a function of one or more of:

an average Total Suspended Solids (TSS) concentration in the mixed liquor;

a desired MLSS concentration in the upstream treatment zones;

a total influent flow to the treatment process; and a percentage of that flow being treated by the gravity settling device.

* * * * *